(12) United States Patent
Allouche et al.

(10) Patent No.: US 12,386,867 B2
(45) Date of Patent: Aug. 12, 2025

(54) SYSTEM AND METHOD FOR RAPID INITIALIZATION AND TRANSFER OF TOPIC MODELS BY A MULTI-STAGE APPROACH

(71) Applicant: GONG.io Ltd., Ramat Gan (IL)

(72) Inventors: Omri Allouche, Tel Aviv (IL); Inbal Horev, Tel Aviv (IL); Eyal Ben David, Kibbutz Yagur (IL); Adi Kopilov, Tel Aviv (IL)

(73) Assignee: GONG.io Ltd., Ramat Gan (IL)

( * ) Notice: Subject to any disclaimer, the term of this patent is extended or adjusted under 35 U.S.C. 154(b) by 429 days.

(21) Appl. No.: 17/815,294

(22) Filed: Jul. 27, 2022

(65) Prior Publication Data

US 2024/0037126 A1 Feb. 1, 2024

(51) Int. Cl.
*G06F 40/00* (2020.01)
*G06F 16/31* (2019.01)
*G06F 40/289* (2020.01)
*G06F 40/35* (2020.01)

(52) U.S. Cl.
CPC .......... *G06F 16/313* (2019.01); *G06F 40/289* (2020.01); *G06F 40/35* (2020.01)

(58) Field of Classification Search
CPC ........ G06F 16/313; G06F 40/35; G06F 40/30; G06F 40/00; G06F 40/20; G06F 40/205; G06F 40/232; G06F 40/237; G06F 40/242; G06F 40/247; G06F 40/253; G06F 40/268; G06F 40/274; G06F 40/279; G06F 40/284; G06F 40/289; G06F 40/295
See application file for complete search history.

(56) References Cited

U.S. PATENT DOCUMENTS

| | | | |
|---|---|---|---|
| 6,178,420 B1 * | 1/2001 | Sassano | G06F 16/313 |
| | | | 707/E17.084 |
| 6,490,548 B1 * | 12/2002 | Engel | G06F 40/58 |
| | | | 707/999.1 |
| 8,214,242 B2 | 7/2012 | Agapi et al. | |
| 8,706,678 B2 | 4/2014 | Stefik | |
| (Continued) | | | |

FOREIGN PATENT DOCUMENTS

EP    3432155 A1    1/2019

OTHER PUBLICATIONS

Great Learning Team. "Understanding Latent Dirichlet Allocation (LDA)". Oct. 16, 2020. https://www.mygreatlearning.com/blog/understanding-latent-dirichlet-allocation/.

*Primary Examiner* — Edgar X Guerra-Erazo
(74) *Attorney, Agent, or Firm* — M&B IP Analysts, LLC (57) ABSTRACT

A system and method for a multi-stage approach for creating topic models is presented. The method includes applying a first stage topic model to textual data, wherein the first stage topic model is trained to discover a first plurality of topics and distributions of words in each topic of the first plurality of topics from the textual data; generating at least one seeded word for a subset of topics of the first plurality of topics, wherein the at least one seeded word is determined based on a plurality of selection rules and the distributions of words in the subset of topics discovered in the first stage topic model; and creating a second stage topic model by feeding the generated at least one seeded word to direct identification of the subset of topics of the first plurality of topics.

19 Claims, 5 Drawing Sheets

(56) References Cited

U.S. PATENT DOCUMENTS

| | | |
|---|---|---|
| 10,642,889 B2 | 5/2020 | Reshef et al. |
| 11,429,901 B1 * | 8/2022 | McCourt .................. G06N 7/01 |
| 2014/0214402 A1 | 7/2014 | Diao et al. |
| 2020/0065334 A1 * | 2/2020 | Rodriguez .............. G06F 40/35 |
| 2021/0027772 A1 | 1/2021 | Horev et al. |
| 2022/0171938 A1 * | 6/2022 | Jalaluddin ............... G06F 40/30 |
| 2024/0004912 A1 * | 1/2024 | Anand ................ G06F 18/2133 |

* cited by examiner

FIG.5

SYSTEM AND METHOD FOR RAPID INITIALIZATION AND TRANSFER OF TOPIC MODELS BY A MULTI-STAGE APPROACH

TECHNICAL FIELD

The present disclosure relates generally to processing textual data, more specifically to techniques for creating seeded topic models for rapid initialization and transfer.

BACKGROUND

In sales organizations, especially these days, meetings are conducted via teleconference or videoconference calls. Further, emails are the primary communication means for exchanging letter offers, follow-ups, and so on. In many organizations, sales calls are recorded and transcribed into textual data. Such textual data of transcribed calls, emails, and the like, are stored as corpus for subsequent review. It has been identified that such corpus pertains valuable information about the sales including, but not limited to, trend, process, progress, approaches, tactics, and more. However, due to the complexity and the sheer volume of records, reviewing these records and moreover, to derive insights is challenging and time-consuming, and in return, most of the information cannot be exploited.

Extraction of sales information from records such as calls, meetings, emails, and the like, have been performed by, for example, identification of keywords or phrases in conversations saved in the textual corpus. Identification of keywords may flag meaningful conversations to follow-up on or provide further processing and analysis. For example, identifying the word "expensive" may be utilized to improve sales process.

A few solutions are discussed, in the related art, to identify keywords or phrases in the textual data. Such solutions are primarily based on textual searches or natural language processing (NLP) techniques. However, such solutions suffer a few limitations, including, but not limited to, the accuracy of identification of keywords and identification of keywords in a similar semantic field. The accuracy of such identification is limited as a search is performed based on keywords taken from a predefined dictionary. As such transcription may not be accurate (e.g., background noise), the identification may not be complete if only a keyword search is applied.

Further, even if the transcription is clear and without errors, simple identification of keywords without understanding the subject matter can result incomplete deciphering of the textual data based on various conversations. To this end, methods to identify topics and understand subject matter within transcribed conversations are utilized. Identifying topics to summarize and/or uncover conversation structures can be helpful for faster analysis and navigation of the large volume of records.

Current approaches for discovering topics within the transcribed textual data are primarily based on unsupervised machine learning techniques. It has been identified that determining clusters of relevant words as topics using such techniques allows a simple start in the analysis process without pre-training or limitations from the number of predefined training datasets. However, discovery of topics using such unsupervised machine learning techniques can cause inaccurate and inconsistent results. Moreover, the discovered topics and associated words may be somewhat irrelevant to the desired information. In addition, due to the unsupervised nature of the techniques, control and initialization of the discovery are challenging. And thus, approaches to incorporate a-priori knowledge and allow control over topic discovery are desired for improved accuracy and practicality.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a multi-stage method for creating topic models. The method comprises: applying a first stage topic model to textual data, wherein the first stage topic model is trained to discover a first plurality of topics and distributions of words in each topic of the first plurality of topics from the textual data; generating at least one seeded word for a subset of topics of the first plurality of topics, wherein the at least one seeded word is determined based on a plurality of selection rules and the distributions of words in the subset of topics discovered in the first stage topic model; and creating a second stage topic model by feeding the generated at least one seeded word to direct identification of the subset of topics of the first plurality of topics.

Certain embodiments disclosed herein also include a non-transitory computer readable medium having stored thereon causing a processing circuitry to execute a process, the process comprising: applying a first stage topic model to textual data, wherein the first stage topic model is trained to discover a first plurality of topics and distributions of words in each topic of the first plurality of topics from the textual data; generating at least one seeded word for a subset of topics of the first plurality of topics, wherein the at least one seeded word is determined based on a plurality of selection rules and the distributions of words in the subset of topics discovered in the first stage topic model; and creating a second stage topic model by feeding the generated at least one seeded word to direct identification of the subset of topics of the first plurality of topics.

Certain embodiments disclosed herein also include a system for creating topic models. The system comprises: a processing circuitry; and a memory, the memory containing instructions that, when executed by the processing circuitry, configure the system to: apply a first stage topic model to textual data, wherein the first stage topic model is trained to discover a first plurality of topics and distributions of words in each topic of the first plurality of topics from the textual data; generate at least one seeded word for a subset of topics of the first plurality of topics, wherein the at least one seeded word is determined based on a plurality of selection rules and the distributions of words in the subset of topics discovered in the first stage topic model; and create a second stage topic model by feeding the generated at least one seeded word to direct identification of the subset of topics of the first plurality of topics.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments present a system and a method for rapid initialization of topic models using a multi-stage approach. A two-stage topic modeling approach is presented to objectively generate seeded words and initialize the topic model for more accurate and efficient discovery of topics in textual data collected from various conversations, such as, but not limited to, videoconferences, telephonic calls, emails, text messages, chats, and the like. The seeded words (or keywords) may be generated from a first stage topic model trained to discover topics and associated cluster of words for a corpus of textual data. The disclosed embodiments utilize the output of the first stage topic model to generate seeded words that in return, initialize and direct the discovery of relevant topics in a second stage topic model.

It has been identified that extensive time and resources are needed to discover relevant topics in conversations using topic models that use unsupervised machine learning algorithms. To this end, in the disclosed embodiments, by implementing the seeded words, the second stage topic model is equipped with domain knowledge gathered through the extensive training performed at the first stage topic model. Such transfer of knowledge may be utilized to enable rapid and efficient convergence in identifying relevant topics in the second stage topic model. That is, the second stage topic model avoids generation and training from the ground up, and instead initialized to discover desired and relevant topics from future conversations. In an embodiment, the second stage topic model is applied to the future conversations, for example but is not limited to, newly recorded, between different participants, in a different corpus, in another language, and the like, and any combination thereof to accurately and efficiently identify relevant topics. Moreover, such accurately discovered topics may be utilized to facilitate navigation through the various conversations to uncover valuable information that may otherwise be hidden.

The embodiments disclosed herein also provide an advantageous objective analysis of conversations to improve consistency and accuracy of determined seeded words for initialization. It has been identified that current methods of seeding in topic models can often be subjective, based on hypotheses and expectations of individual users. Such subjective determination of seeded words can largely vary and be inconsistent between the individuals. Moreover, these seedings may not accurately represent the contents and topics of the stored conversations, which in return, when seeded in the topic model, can result in ineffective discovery of relevant topics. However, the multi-stage approach, of the embodiments disclosed herein, creates a second stage topic model by feeding seeded words that are objectively determined by the first stage topic model. The second stage topic model created according to the disclosed embodiments is capable of discovering relevant topics with improved consistency and accuracy. Moreover, such effective topic model can be rapidly and efficiently implemented in a new topic model through transferring of a priori knowledge from prior stage topic models.

Figure 1:
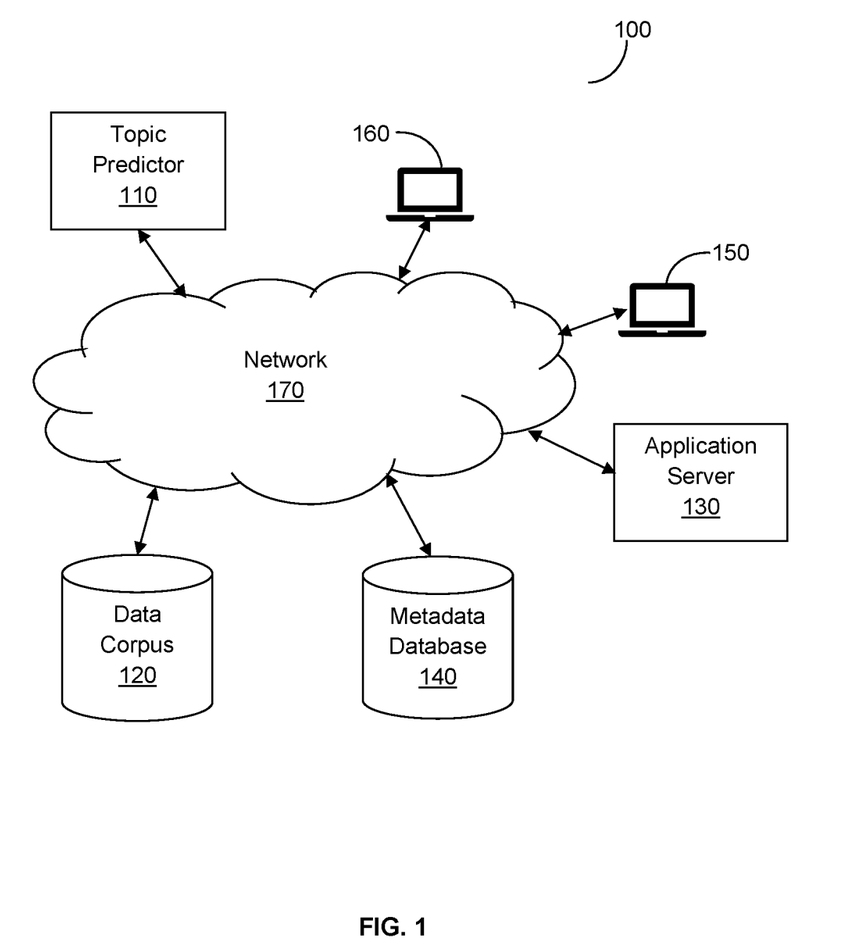
FIG. 1 is a network diagram utilized to describe the various disclosed embodiments.

FIG. 1 shows an example network diagram 100 utilized to describe the various disclosed embodiments. In the example network diagram 100, a topic predictor 110, a data corpus 120, an application server 130, a metadata database 140, a user terminal 150, and a customer device 160 connected to a network 170. The network 170 may be, but is not limited to, a wireless, a cellular or wired network, a local area network (LAN), a wide area network (WAN), a metro area network (MAN), the Internet, the worldwide web (VVWW), similar networks, and any combination thereof.

The data corpus (or simply "corpus") 120 includes textual data from transcripts, recorded calls or conversations, email messages, chat messages, instant messages, short message systems (SMS), chat logs, and other types of textual documents. In an example embodiment, the textual data in the corpus 120 include communication records, such as transcripts of telephone communications with customers. As an example, the textual data may include sales-related communication with a company and their customers. The corpus 120 provides textual data to the topic predictor 110 and the application server 130 over the network 170. In an embodiment, the data corpus 120 may include a distribution of topics associated with the textual data as determined by the topic predictor 110. In further embodiment, the data corpus 120 may include textual data with a plurality of segmented portions (or chunks), each associated with a topic from a plurality of topics that are discovered. The corpus 120 may further include a plurality of seeded words generated from the topic predictor 110.

In an example embodiment, topics identified from textual data may be retrieved by the application server 130 for further analysis such as, but not limited to, generating notification, alerts, opening certain documents, and the like. In a further example embodiment, the application server 130 may generate a report of topics in the textual data in a chronological order. In yet another example embodiment, the application server 130 may utilize the identified topics of a conversation together with associated metadata and/or historical data to provide a win or loss analysis in a sales-related corpus.

In an embodiment, the corpus 120 may include a plurality of isolated groups of textual data that are grouped according to customers (or tenants), so that one isolated group may include textual data related to one customer. The isolated groups of textual data may prevent mix-up of textual data between customers to ensure privacy.

The metadata database 140 may include metadata on textual data of, for example, emails, transcribed calls, and the like, stored in the corpus 120. In an embodiment, metadata may include associated information of the textual data such as, but not limited to, participants' information, time stamp, and the like. In further embodiment, metadata may include information retrieved from customer relationship management (CRM) systems or other systems that are utilized for keeping and monitoring deals. Examples of such information includes participants of the textual data, a stage of a deal, date stamp, and so on. The metadata may be used in further analysis of textual data at the application server 130.

The user terminal 150 is a device, component, system, or the like, configured to provide input, such as but is not limited to, a number of topics for the topic models. In an embodiment, the user terminal 150 may be used to provide a list of relevant seeded words. In some embodiments, parameters such as, without limitation, weights of a subset or selection of seeded words may be modified in a predefined direction. In an embodiment, the user terminal 150 may include, but not limited to, a personal computer, a laptop, a tablet computer, a smartphone, a wearable computing device, or any other device capable of receiving and displaying textual data.

The user terminal 150 may enable trainer access to the topic predictor 110 and/or the application server 130. In an embodiment, the trainer access is utilized to name each of the identified topics. The application server 130, in some configurations, can process or otherwise analyze textual data and historical data in the corpus 120 based on the identified topic distribution. The application server 130 may generate and send notifications such as, but not limited to, reminders, suggestions, and the like, based on output from the topic predictor 110. For example, the application server 130 can associate discovered topics (from the topic predictor 110) to an alert. As another example, the application server 130 can generate a report of the topic distribution within the textual data together with associated metadata retrieved from the metadata database 140. In an embodiment, such notifications and the like may be presented to a customer via a customer device 160. The topic predictor 110 is a component of the application server 130.

According to the disclosed embodiments, the topic predictor 110 is configured with multi-stage topic models to discover relevant topics from the textual data in the corpus. The topic predictor 110 includes one or more topic models for applying the tokenized textual data. The topic model is a machine learning model trained to discover a set of topics and words associated to the topic to output a distribution of topics for each input textual data. In an example embodiment, when the corpus 120 includes sales-related communications with a company and their customers, the topic model may discover one or more topics on the subject matter of, for example, but not limited to, "small talk," "pricing," "next step," "contract," "sports," and the like. In an embodiment, the topic model may be trained using the textual data of the corpus 120 to increase accuracy and consistency in topic discoveries.

The topic predictor 110, in the disclosed embodiments, is configured to generate seeded words that are utilized to create a second stage seeded topic model. The topic predictor 110 includes a first stage topic model that is trained to identify one or more topics and a distribution of words associated with the topic. The first stage topic model is trained using the large amount of textual data available in the corpus 120 in order to discover a predetermined number of topics and accurately determine a distribution of topics in new input textual data. In a further embodiment, the output discovered topics including a plurality of words may be named as certain subject matter such as, but not limited to, "pricing," "contract," "vacation," and the like, based on a plurality of naming rules. In an embodiment, naming of each discovered topic may be generated using natural language processing (NLP) models. In another embodiment, naming of each discovered topic may be performed by a user at the user terminal 150. In an embodiment, the topic model may be an unsupervised machine learning model, such as, but not limited to, Latent Semantic Analysis (LSA), Probabilistic Latent Semantic Analysis (PLSA), Latent Dirichlet Allocation (LDA), and Correlated Topic Model (CTM), and the like, to determine topics, which are a cluster of words, for input textual data.

In an embodiment, a number of topics to discover may be predetermined by a user of, for example, but not limited to, a user terminal 150. In an embodiment, training of the first stage topic model may be from the bottom up, without any predefined data to guide the topic model to identify certain topics or words. In another embodiment, certain parameters and/or weights may be predefined for training, which will enable some control over the identified topics toward an expected and/or desired output. It should be noted that the accuracy of the first stage topic model improves with progressive training and applying the large amount of textual data in the corpus 120. The trained first stage topic model effectively and accurately identifies one or more topics of future textual data, that is newly introduced into the corpus 120.

In an embodiment, seeded words may be generated based on the distribution of words and topics discovered by the first stage topic model. Such seeded words are keywords that are closely related to and define one or more topics. In an example embodiment, the seeded words may include one or more words from the cluster of words for each discovered topic. Such seeded words may be selected based on a plurality of selection rules that includes, for example, but not limited to, a frequency of occurrence, probability of words (or phrases), proximity of words, and the like. As an example, a cluster of words identified for topic-1 that is named as "pricing" includes words "fee", "price", "amount", and "expensive". In the same example, "price" and "expensive" may be generated as seeded words due to highest probability amongst the cluster of words that is output as a distribution from the first stage topic model. In some embodiments, the seeded words may be generated based on a predetermined list that is input via a user terminal 150.

In an embodiment, the topic predictor 110 is configured to utilize the generated seeded words from the first stage topic model to create the second stage topic model. Here, the second stage topic model is a seeded topic model that can be initialized by feeding the seeded words generated from the first stage topic model. The seeded words direct the discovery of associated topics to uncover such relevant topics. It should be appreciated that feeding the generated seeded words effectively transfers the first stage topic model knowledge to the second stage topic model. In an embodiment, the second stage topic model may be trained using the textual data in the corpus 120 to improve its accuracy of output.

The topic predictor 110 may be realized as a physical machine (an example of which is provided in FIG. 5), a virtual machine (or other software entity) executed over a physical machine, and the like.

The customer device 160, may be, but is not limited to, a personal computer, a laptop, a tablet computer, a smartphone, a wearable computing device, or any other device capable of receiving and displaying textual data. In an embodiment, the customer device 160 is used to present and display topic distributions within the textual data in forms of, for example, but not limited to, notifications, lists, reports, suggestions, and the like. In some embodiments, an alert may be presented via the customer device 160 upon identifying a certain topic within the input textual data. For example, when a topic of "next step" is identified, the customer via the customer device 160 is presented with an alert indicating presence of the topic and a location of identified topic within the transcription. In another example, the alert may include a list of follow-up tasks associated with the topic of "next step," for example, contact upper management, send out questionnaire, and the like, and more. The customer device 160 is also used to present and display the textual data, for example but not limited to, transcripts of conversations, emails, and more, that are received by the customer. It should be noted that the type of notification may be different and predetermined based on the specific topic discovered by the topic predictor 110.

In an embodiment, the customer (user) may interact with the presented notification via a graphical user interface at the customer device 160. The graphical user interface may display the notification in the various forms noted above as well as the portions of the transcribed conversations with identified topics. In such cases, the graphical user interface may be utilized to navigate and search through the transcribed conversations based on the topic indications for portions of interest. In another example embodiment, the graphical user interface may display the notification with additional information such as, but not limited to, on-going deals with the participants of the conversation, company or sender information, stage in the sales deal process, and more.

It should be noted that the elements and their arrangement shown in FIG. 1 are shown merely for the sake of simplicity. Other arrangements and/or a number of elements should be considered without departing from the scope of the disclosed embodiments. For example, the topic predictor 110, the corpus 120, application server 130, and the user terminal 150 may be part of one or more data centers, server frames, or a cloud computing platform. The cloud computing platform may be a private cloud, a public cloud, a hybrid cloud, or any combination thereof.

Figure 2:
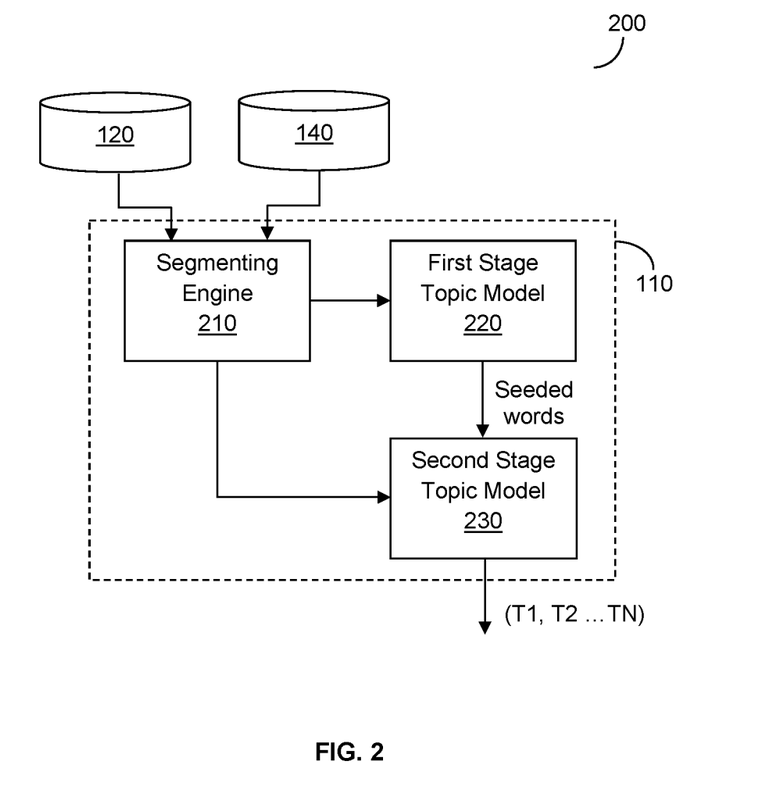
FIG. 2 is a flow diagram illustrating a multi-stage topic modeling approach for discovering seeded topics according to an embodiment.

FIG. 2 is an example flow diagram 200 illustrating a multi-stage topic modeling approach for discovering seeded topics according to an embodiment. The flow diagram 200 herein may be performed within the topic predictor 110, FIG. 1. For simplicity and without limitation of the disclosed embodiments, FIG. 2 will also be discussed with reference to the elements shown in FIG. 1.

The flow diagram 200 shows a two-stage topic modeling approach. A first stage topic model 220 is generated and trained to discover a predetermined number of topics for the corpus 120. The first stage topic model 220 is generated by training using the textual data in the corpus 120, where accuracy to discover topics improves with ongoing training. In an embodiment, the trained first stage topic model 220 may be utilized to generate seeded topics. The seeded topics are incorporated (or fed) in a second stage topic model 230 in order initialize the second stage topic model 230 based on prior knowledge and training from the first stage topic model 220.

In an embodiment, the topic models are unsupervised machine learning algorithm such as, but not limited to, Latent Semantic Analysis (LSA), Probabilistic Latent Semantic Analysis (PLSA), Latent Dirichlet Allocation (LDA), and Correlated Topic Model (CTM), and the like, to determine topics, which are cluster of words, for input textual data.

In an embodiment, the topic predictor 110 includes a segmentation engine 210 configured to tokenize textual data received from the corpus 120. The textual data may be segmented into smaller portions such as, but not limited to, paragraphs, sentences, certain number of words, and the like. In an example embodiment, a portion of the textual data may include about 200 words. The textual data is segmented into one or more portions in order to allow each portion to include a single topic. In an embodiment, the size of the portion of the textual data may be predefined and updated through the user terminal 150. In a further embodiment, post-processing of the segmented portions may be performed to remove common English words, for example, but not limited to, "the", "all", "about", and the like, prior to further processing at the topic models. In an embodiment, the segmentation engine 210 may use metadata associated with the textual data in performing tokenization of the textual data. The segmentation engine 210 is configured to process the textual data from the corpus 120 prior to applying one or more topic models (220 or 230) in the topic predictor 110.

In an embodiment, the segmented portions of the textual data are input into the first stage topic model 220 for training. The first stage topic model 220 may be trained using the large amount of textual data in the corpus 120 in order to accurately discover topics relevant and/or prevalent in the corresponding corpus 120. In an embodiment, the trained first stage topic model may be configured to output a distribution of discovered topics of a new textual data (e.g., new transcribed conversations received at the corpus, and the like). The distribution of discovered topics presents the plurality of segments (or portions) to belong to various topics discovered from the model. In an embodiment, parameters such as, but not limited to, weights, keywords, and the like, may be introduced into the first stage topic model 220 to control the output via a user terminal 150. It should be noted that such modifications of parameters are generally based on hypothesis or expectations and may not be necessarily data driven. It should be also appreciated that training using the textual data provides optimization of the first topic model 220 for the consistent discovery of relevant topics.

In an embodiment, seeded words are generated from the trained first stage topic model 220. The seeded words, in the embodiment, are one or more words that important for directing a topic model to discover and converge to topics of interest (e.g., pricing, contract, and the like for sales communications). Here, the first stage topic model 220 is trained based on the textual data stored in the corpus 120, and thus, the discovered topics and the associated clusters of words are expected to accurately represent the corpus 120.

In an embodiment, the seeded words are determined from the cluster of words and their distribution in each of the topics based on a plurality of selection rules. In an example embodiment, the seeded words may be a subset of the cluster of words that, for example, but without limitation, show the highest frequency of occurrence, appear in close proximity to each other, have the greatest probability, and the like, and any combination thereof, in each of the topics. In some embodiments, the seeded words are determined based on high pointwise mutual information (PMI) on pairs of words indicative of certain topics.

As an example, for topic-1 of subject matter "contract," words such as "contract", "approval", and "signature" may be selected based on greater weight over "documents" and "quote." In another example embodiment, the seeded words may be selected regardless of the associated topic. As an example, top 50 words that was identified most prominently may be selected as seeded words. In an embodiment, the generated seeded words may be stored at the corpus 120. In an embodiment, words within the cluster of words are ubiquitous across topics, but differ in their distributions and probabilities at each discovered topic.

According to the disclosed embodiments, the second stage topic model 230 is created by implementing the seeded words generated by the first stage topic model 220. The second stage topic model 230 is a seeded topic model that is initialized using the seeded words. Initialization enables transfer of knowledge and control over the second stage topic model 230 to be driven in the desired direction and output relevant topics. The seeded words are input in the second stage topic model 230 as a dictionary to allow effective discovery of topics associated with the seeded words. In an embodiment, seeding (i.e., incorporating associated seeded words) may be selectively determined to seed certain topics and leave other topics free to discover topics without guidance from the seeded words. In an embodiment, the second stage topic model 230 may be separate from the first stage topic model 220. In another embodiment, the second stage topic model 230 may be a modified version of the first stage topic model 220 initialized using the generated seeded words.

The initialized second stage topic model is configured to discover seeded topics in new textual data (e.g., new transcribed conversations of a different meeting, of a separate company, in a different language, and more) that are received from the corpus 120. In another embodiment, the second stage topic model 230 may be further trained by applying, for example, an unsupervised machine learning model, on the stored textual data in the corpus 120. It should be noted that initialization using the seeded words allow the newly created second stage topic model 230 to be inherently trained similar to the first stage topic model 220 for discovery of relevant topics. And thus, the extensive training processes performed for the first stage topic model 220 may be omitted to conserve processing time and resources for such training.

In an identification phase, according to the embodiment, the trained second stage topic model 230 is configured to receive segmented portions of the textual data from the segmenting engine 210 to discover topics, including seeded topics. That is, the seeded second stage topic model 230 can efficiently identify the seeded topics due to the dictionary of seed words provided. The textual data may include new textual data such as, but not limited to, transcribed calls, transcribed videoconferences, email communications, chat logs, and the like, and any combination thereof. In an example embodiment, the textual data received at the second stage topic model 230 may be from a different corpus than that of the corpus utilized in the first stage topic model 220. In an embodiment, the output of the second stage topic model 230 is a vector representation of the distribution of the topics for each segment (or tokenized portion) of the textual data, for example, (T1, T2, . . . , TN), where T1 represents a probability of topic-1 that is equal to or less than 1, and N represents the topic number greater than 1. In an embodiment, the number of topics, N, may be predetermined through a user terminal 150. In a further embodiment, the second stage topic model 230 may output words distributions for each of the discovered topics in order to indicate the probability of the words within the topic. As an example, the word "expensive" may have a probability of 0.8 in topic-1 of "pricing," 0.5 in topic-2 of "contract," and 0.1 in topic-3 of "sports."

As an example, a second stage topic model 230 may be initialized with seeded words of "competitor", "alternative", and "differentiator" for topic-5 on the subject matter of "competition" and all other topics, topic-1 through topic-4 may not be seeded. As noted above, the three seeded words may be selected based on a plurality of selection rules. In the same example, the second stage topic model 230 outputs a distribution of topics, topic-1 through topic-5, where topic-5, when identified, relates to "competition" and topic-1 through topic-4 are discovered based on the textual data. It should be noted that the same second stage topic model 230 may identify the subject matter of topic-1 through topic-4 to be different depending on the content of the input textual data. It should also be noted that even with the seeded words on the topic-5 "competition", the "competition" topic may not be discovered if words associated with the topic are absent in the input textual data.

In some embodiments, the second stage topic model 230 may be created for another language by translating the generated seeded words (from the first stage topic mode 220) into a specific language. In such scenario, the seeded words in the specific language may be expanded to include, for example, but not limited to, exact translation, synonyms, related words, and the like, and any combination thereof. In a further embodiment, a multilingual word embedding model may be applied to the generated seeded words to determine seeded words to be fed into creating the second stage topics model.

It should be appreciated that the multi-stage topic modeling approach not only facilitates the creation of new topic models, but also significantly reduces the processing time and resources by directing the topic model to converge to relevant semantic field of the seeded words. To this end, the multi-stage topic modeling approach enables accurate and efficient discovery of relevant topics that align to, for example, but not limited to, a client, a company, an industry, a field, and the like, and any combination thereof. In an embodiment, such discovered topics can be further processed and utilized to analyze the vast amount of conversational data collected and stored.

It should be noted that the first stage topic model 220 and the second stage topic model 230 can be realized as or executed as one or more hardware logic components and circuits. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

Figure 3:
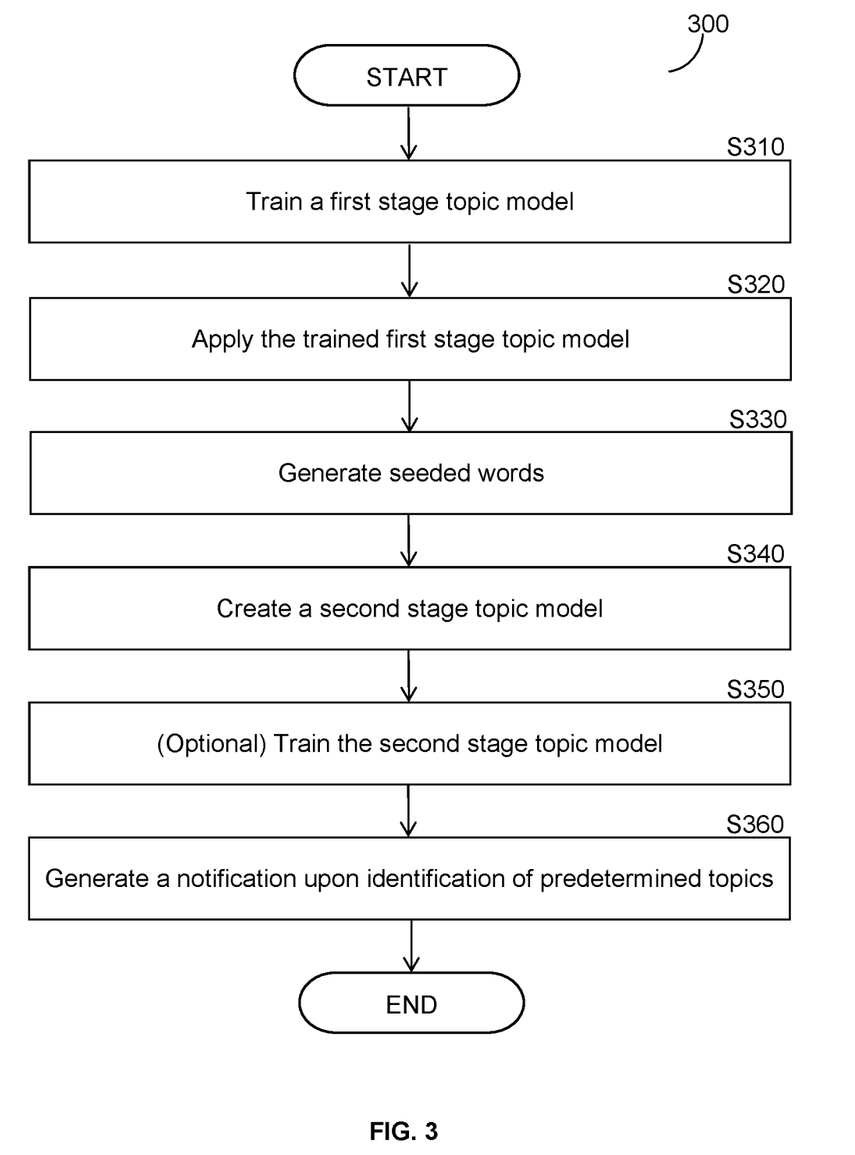
FIG. 3 is flowchart illustrating a method for creating a second stage topic model based on seeded words according to an embodiment.

FIG. 3 is an example flowchart 300 illustrating a method for creating a second stage topic model based on seeded words according to an embodiment. The method described herein may be executed by a topic predictor 110, FIG. 1. In some example embodiments, the models in the topic predictor 110 may run an unsupervised learning, a semi-supervised learning, and the like.

At S310, a first stage topic model is trained. At least one algorithm, such as an unsupervised machine learning algorithm, is applied to textual data in the corpus (e.g., the corpus 120, FIG. 1). The textual data may include for example, but not limited to, transcribed conversations, email communications, SMS, chat logs, and the like. It should be noted that a previously trained first stage topic model can be implemented for the method described herein. The training of the first stage topic model may be continuously performed until determined to be well trained. The decision to stop training of the first stage topic model may be determined by a training personnel at the user terminal (e.g., the user terminal 150, FIG. 1) or after a predetermined number of iterations. In an embodiment, a training dataset including a specified number of textual data may be used to train the first stage topic model.

At S320, the trained first stage topic model is applied to the textual data. The textual data, for example the transcribed conversations, are segmented into one or more portion such as, but not limited to, paragraphs, sentences, specific number of continuous words, and preprocessed for input into the trained first stage topic model. The preprocessing of textual data may include, but is not limited to, removing common English words (e.g., "the," "a," "about," "like," and more), and the like. In an embodiment, the trained first stage topic model is configured to determine a distribution of topics in the input textual data. In an example embodiment, the distribution of topics in a segmented portion may be presented in a vector form such as, for example, (0.2, 0.5, 0.3) for three topics with each number representing coverage of each topic, topic-1, topic-2, and topic-3, in an input textual data. In a further embodiment, a cluster of words in conjunction to respective probabilities in each discovered topic may be determined. In an embodiment, each discovered topic in the textual data may be named as a subject selected from a plurality of words for each associated topic. In another embodiment, each discovered topic in the textual data may be named according to a predetermined topic name. In an example embodiment, naming of each discovered topic may be performed via a user terminal (e.g., the user terminal 150, FIG. 1).

The trained first stage topic model is utilized to identify a plurality of words related to each other and grouped into a single common topic. That is, a plurality of words representing one common topic may be grouped together in order to generate one or more groups each including a plurality of words for each discovered topic. As an example, group 1 of topic-1 may include words such as, "weather", "baseball", "vacation", "San Francisco", "amount" related to "small talk" and group 2 of topic-2 may include words such as, "price", "fee", "amount", "expensive", related to "pricings". In an embodiment, a number of topics may be predetermined by the user terminal (e.g., the user terminal 150, FIG. 1). In some embodiments, the plurality of words for the topic may be identified from a larger pool (or dictionary) of words and may appear in multiple groups of the plurality of words. In yet another embodiment, the plurality of words for all discovered topics may be commonly shared, but represented at different probabilities and distributions for each respective topic.

In some embodiments, the first stage topic model may be fed with for example, but not limited to, predetermined words, weights, topics, and the like, and any combination thereof, to guide direction of the topic model to discover topics of interest. In an example embodiment, business values may be a topic of interest and thus, the topic model may be guided to discover topics such as, without limitation, "pricing", "contract", "competitor", "next step", "orders", and the like, and any combination thereof.

At S330, seeded words are generated based on the output of the trained first stage topic model. The seeded words are keywords that are identified to be closely representing each of the associated topics by the trained first stage topic model. The seeded words may be determined from the plurality of words identified for each topic based on a plurality of selection rule. In an embodiment, the seeded words may be generated based on the most recurring word from the plurality words for each topic. As an example, seeded words of "dollar," "fee," and, "contract" may be generated for topic-1 relevant to a subject of "contract." In another embodiment, the seeded words may be generated based on identified frequency of a word regardless of relevant topics. As an example, top 50 frequently identified words may be used to generate the seeded words. In an embodiment, the generated seeded words may be stored at a memory (not shown) or the corpus (e.g., the corpus 120, FIG. 1).

At S340, a second stage topic model is created. The second stage topic model is created by feeding the generated seeded words into the topic model to result in a seeded topic model. The generated seeded words for each topic is utilized as a dictionary for the second stage topic model to discover the associated topics. In an embodiment, only a subset of the generated seeded words may be fed into the topic model. As an example, the second stage topic model may be created by only seeding seeded words for three topics. In the same example, the second stage topic model is allowed to freely discover words and common topics for all other topics in which the seeded words are not utilized.

In an embodiment, the created second stage topic model is configured to identify one or more topics in future conversations (i.e., new textual data of transcribed conversations added to the corpus) based on the seeded words. In an example embodiment, the textual data may be a portion of a videocall between a customer and a salesperson and include metadata associated with the textual data such as, but is not limited to, time stamp, date, participant names, and the like, and any combination thereof. In an embodiment, the future conversations may include conversations involving other participants, of other companies, in another language, and the like, and any combination thereof. In an embodiment, the seeded words guide the discovery of relevant topics that may otherwise remain undiscovered and/or discovered after extensive training.

It should be noted that feeding of the seeded words to the second stage topic model directly transfers domain knowledge achieved at the first stage topic model. Moreover, feeding allows rapid and effective initialization of the second stage topic model to discover certain topics (and associated subjects) of the seeded words. Thus, the second stage topic model can be controlled to converge and be driven in a desired direction, topic, subject, and the like. In an embodiment, the seeded words may be retrieved from the corpus (e.g., the corpus 120, FIG. 1). In another embodiment, the seeded words used for creating the second stage topic model may be selected by a user via a user terminal and/or a customer device (e.g., the user terminal 150 and/or the customer device 160, FIG. 1).

In an embodiment, the second stage topic model may be a newly created topic model separate from the first stage topic model. In another embodiment, the second stage topic model may be an updated version of the first stage topic model by feeding in the seeded words.

At S350, optionally, the second stage topic model is trained. In an embodiment, training may be performed as need to further optimize the second stage topic model for discovering relevant topics. At least one algorithm, such as an unsupervised machine learning algorithm, may be applied to textual data in the corpus (e.g., the corpus 120, FIG. 1) for training of the second stage topic model based on the fed seeded words. In an embodiment, the textual data trained for the second stage topic model may be transcribed future conversations that are different from the textual data used to train the first stage topic model. In another embodiment, training of the second stage topic model may be continuously performed until determined to be well-trained. The decision to stop training of the second stage topic model may be determined by a training personnel at at least one of: a user terminal and a customer device (e.g., the user terminal 150 and the customer device 160, FIG. 1) or after a predetermined number of iterations.

At S360, a notification is generated upon identification of predetermined topics. The notification may be generated and caused to be displayed via a customer device (e.g., the customer device 160, FIG. 1). The notification may include, for example, but is not limited to, an alert, a suggestion, a report, and the like, and any combination thereof. In an embodiment, the content and execution of the notification may be determined based on execution rules applying, for example, but not limited to, input textual data, metadata, historical data, and the like. The historical data is textual data and/or identified topics stored in the corpus (e.g., the corpus 120, FIG. 1) that are relevant to the input textual data. Here, relevance may be defined as, for example, but is not limited to, sharing common participants, textual data from the same videoconference, associated company, and the like. In another embodiment, the content and execution of the notification may be predetermined by the user of the user terminal or the customer of the customer device (e.g., the user terminal 150 and the customer device 160, FIG. 1).

As an example, an input textual data of the telephone conversation may be identified to include the "next step" topic with high probability. In such example, an alert notifying presence and location of the "next step" topic may be generated and presented to a customer. Alternatively, in the same example, upon identifying the "next step" topic, a suggestion notification to schedule a meeting with the participants of the telephone conversation may be generated.

Figure 4:
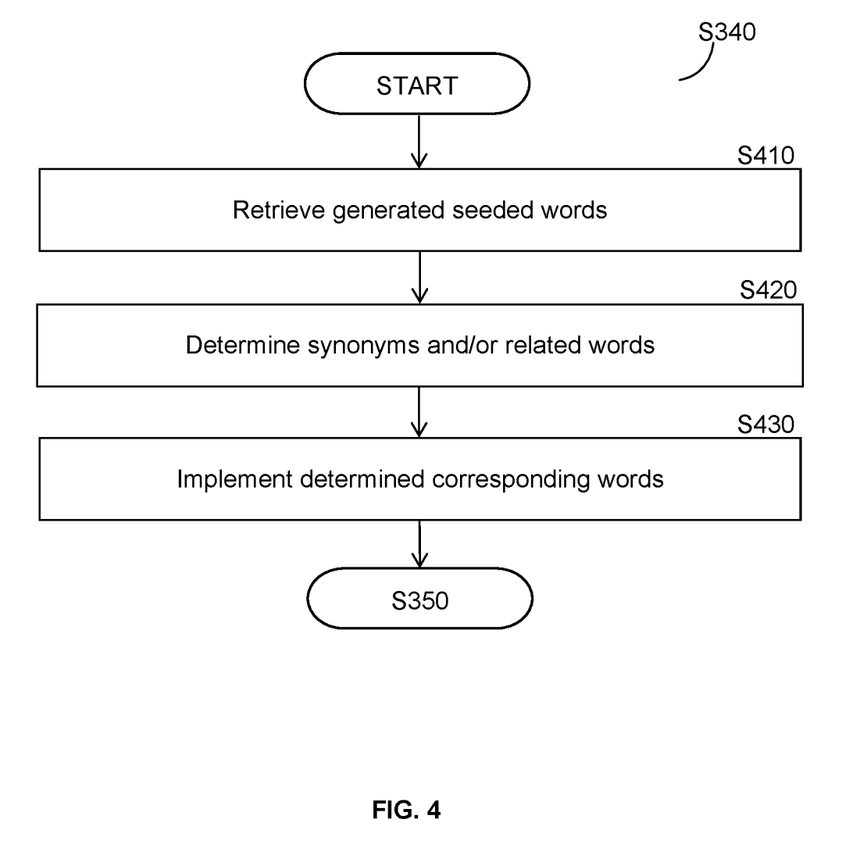
FIG. 4 is a flowchart illustrating a method for creating a second stage topic model for a different language according to an embodiment.

FIG. 4 is an example flowchart S340 illustrating a method for creating a second stage topic model for a different language according to an embodiment. The method described herein may be executed by the topic predictor 110, FIG. 1. It should be noted that the method described herein includes details that may be performed within S340 of the method of FIG. 3 above. The method may be repeated to create a distinct second stage topic model for each language.

At S410, the generated seeded words from the first stage topic model are retrieved. The generated seeded words may be retrieved directly from the output of the trained first stage topic model. In another embodiment, the generated and stored seeded words may be retrieved from the corpus (e.g., the corpus 120, FIG. 1).

At S420, synonyms and/or related words (i.e., corresponding words) for each of the seeded words are determined. Each of the retrieved seeded words is translated into the different language. In an embodiment, the seeded words may be translated into one or more synonyms or related words. In further embodiment, a multilingual word embedding model may be applied to the seeded words to determine the synonymous and/or related words to the seeded words.

At S430, the determined corresponding words (synonym and/or related words) are implemented as seeded words for creating the new second stage topic model. The corresponding words are fed into the topic model to create the second stage topic model for the different language. As noted above, only a subset of the corresponding words may be fed to direct the second stage topic model allowing the model to freely discover one or more topics within the textual data. The created second stage topic model is configured to identify one or more topics that are relevant to the seeded words from new input textual data of the different language.

It should be appreciated that creating the second stage topic model in another language based on the generated seeded words allow rapid initialization of the topic model for discovery of relevant topics. Here, the second stage topic model inherits domain knowledge from conveyance of generated seeded words. Initialization from corresponding words of the seeded words eliminates necessary training from the beginning to reduce processing time and resources. Moreover, initialization of the topic model based on generated seeded topic enable control over topic identification allowing accurate discovery of relevant topics. It should be noted that the method of creating a second stage topic model as described herein is an illustration and does not limit the second stage topic model to models of different languages.

Figure 5:
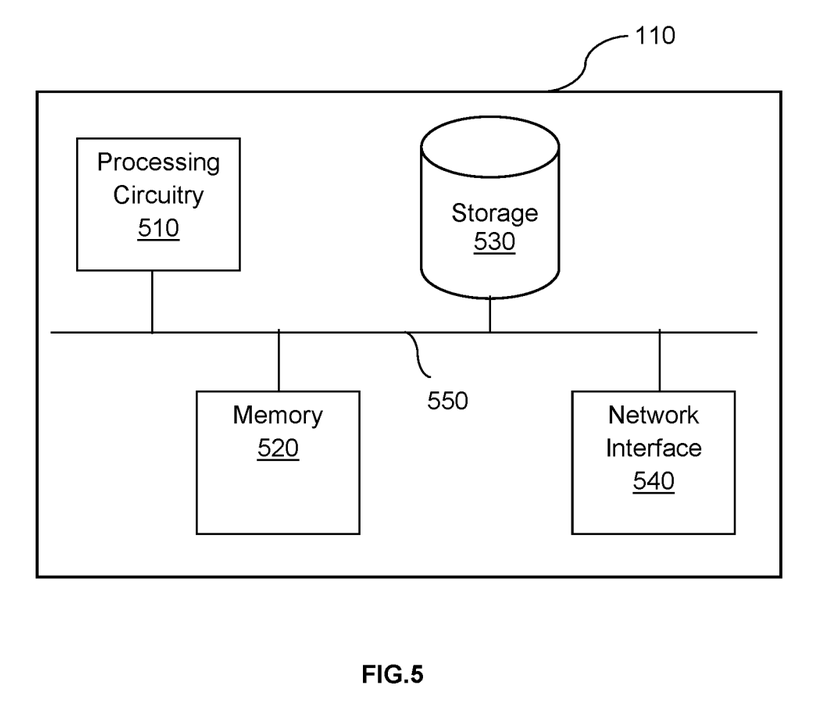
FIG. 5 is a schematic diagram of a topic predictor according to an embodiment.

FIG. 5 is an example schematic diagram of a topic predictor 110 according to an embodiment. The topic predictor 110 includes a processing circuitry 510 coupled to a memory 520, a storage 530, and a network interface 540. In an embodiment, the components of the topic predictor 110 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose central processing units (CPUs), microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the topic predictor 110 to communicate with other elements over the network 170 for the purpose of, for example, receiving data, sending data, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), general purpose compute acceleration device such as graphics processing units ("GPU"), a memory, and input/output interfaces. The computer platform may also include an operating system and microinstruction code. The various processes and functions described herein may be either part of the microinstruction code or part of the application program, or any combination thereof, which may be executed by a CPU or a GPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A multi-stage method for creating topic models, comprising:
    applying a first stage topic model to textual data, wherein the first stage topic model is trained to discover a first plurality of topics and distributions of words in each topic of the first plurality of topics from the textual data;
    generating at least one seeded word for a subset of topics of the first plurality of topics, wherein the at least one seeded word is determined based on a plurality of selection rules and the distributions of words in the subset of topics discovered in the first stage topic model, wherein the at least one seeded word defines a topic in the subset of the first plurality of topics;
    creating a second stage topic model that discovers a second plurality of topics in new input textual data; and
    feeding the generated at least one seeded word to initialize the second stage topic model, wherein the initialization configures the second stage topic model to input the fed at least one seeded word as a dictionary, wherein the at least one seeded word identifies the subset of the first plurality of topics in the new input textual data, wherein the identified subset of the first plurality of topics is part of the second plurality of topics.

2. The method of claim 1, further comprising:
    segmenting the textual data into a plurality of segmented portions, wherein the textual data are transcribed conversations stored in a corpus; and
    training the first stage topic model of an unsupervised machine learning algorithm using the plurality of segmented portions.

3. The method of claim 1, wherein creating the second stage topic model further comprises:
    determining a corresponding word for each of the at least one generated seeded word, wherein the corresponding word is determined based on semantics of the respective at least one generated seeded word; and
    implementing the determined corresponding word as the at least one seeded word in the second stage topic model.

4. The method of claim 3, wherein the corresponding word is any one of: a synonym, a related word, a translation of the synonym, a translation of the related word, and a translation of the respective at least one generated seeded word.

5. The method of claim 3, wherein the corresponding word is determined by applying a multilingual word embedding model.

6. The method of claim 1, wherein the plurality of selection rules includes frequency and probability of words in the first plurality of topics.

7. The method of claim 1, further comprising:
    receiving the new input textual data extracted from recorded conversations; and
    determining the second plurality of topics by applying the received input textual data to the second stage topic model, wherein the second plurality of topics include distributions of the topics and distributions of words within each topic of the second plurality of topics.

8. The method of claim 7, wherein the input textual data includes any one of: a transcript of a call, a transcript of conversations, an email, a short message system (SMS), and a chat log, and wherein the input textual data is in a same language as the at least one seeded words fed into the second stage topic model.

9. The method of claim 1, further comprising:
generating a notification upon identification of at least one predetermined topic; and
causing a display of the notification, based on an execution rule, via a user device, wherein the execution rule is determined based on at least one of: the input textual data, metadata, and historical data.

10. A non-transitory computer readable medium having stored thereon instructions for causing a processing circuitry to execute a process, the process comprising:
applying a first stage topic model to textual data, wherein the first stage topic model is trained to discover a first plurality of topics and distributions of words in each topic of the first plurality of topics from the textual data;
generating at least one seeded word for a subset of the first plurality of topics, wherein the at least one seeded word is determined based on a plurality of selection rules and the distributions of words in the subset discovered in the first stage topic model, wherein the at least one seeded word defines a topic in the subset of the first plurality of topics;
creating a second stage topic model that discovers a second plurality of topics in new input textual data; and
feeding the generated at least one seeded word to initialize the second stage topic model, wherein the initialization configures the second stage topic model to input the fed at least one seeded word as a dictionary, wherein the at least one seeded word identifies the subset of the first plurality of topics in the new input textual data, wherein the identified subset of the first plurality of topics is part of the second plurality of topics.

11. A system for creating topic models, comprising:
a processing circuitry; and
a memory, the memory containing instructions that, when executed by the processing circuitry, configure the system to:
apply a first stage topic model to textual data, wherein the first stage topic model is trained to discover a first plurality of topics and distributions of words in each topic of the first plurality of topics from the textual data;
generate at least one seeded word for a subset of the first plurality of topics, wherein the at least one seeded word is determined based on a plurality of selection rules and the distributions of words in the subset discovered in the first stage topic model, wherein the at least one seeded word defines a topic in the subset of the first plurality of topics;
create a second stage topic model that discovers a second plurality of topics in new input textual data; and
feed the generated at least one seeded word to initialize the second stage topic model, wherein the initialization configures the second stage topic model to input the fed at least one seeded word as a dictionary, wherein the at least one seeded word identifies the subset of the first plurality of topics in the new input textual data, wherein the identified subset of the first plurality of topics is part of the second plurality of topics.

12. The system of claim 11, wherein the system is further configured to:
segment the textual data into a plurality of segmented portions, wherein the textual data are transcribed conversations stored in a corpus; and
train the first stage topic model of an unsupervised machine learning algorithm using the plurality of segmented portions.

13. The system of claim 11, wherein the system is further configured to:
determine a corresponding word for each of the at least one generated seeded word, wherein the corresponding word is determined based on semantics of the respective at least one generated seeded word; and
implement the determined corresponding word as the at least one seeded word in the second stage topic model.

14. The system of claim 13, wherein the corresponding word is any one of: a synonym, a related word, a translation of the synonym, a translation of the related word, and a translation of the respective at least one generated seeded word.

15. The system of claim 13, wherein the corresponding word is determined by applying a multilingual word embedding model.

16. The system of claim 11, wherein the plurality of selection rules includes frequency and probability of words in the first plurality of topics.

17. The system of claim 11, wherein the system is further configured to:
receive the new input textual data extracted from recorded conversations; and
determine the second plurality of topics by applying the received input textual data to the second stage topic model, wherein the second plurality of topics include distributions of the topics and distributions of words within each topic of the second plurality of topics.

18. The system of claim 17, wherein the input textual data includes any one of: a transcript of a call, a transcript of conversations, an email, a short message system (SMS), and a chat log, and wherein the input textual data is in a same language as the at least one seeded words fed into the second stage topic model.

19. The system of claim 11, wherein the system is further configured to:
generate a notification upon identification of at least one predetermined topic; and
cause a display of the notification, based on an execution rule, via a user device, wherein the execution rule is determined based on at least one of: the input textual data, metadata, and historical data.

* * * * *